Nov. 16, 1965  K. A. VAN WORMER, JR  3,217,436
DISPLAYING

Filed June 25, 1962  2 Sheets-Sheet 1

INVENTOR.
Kenneth A. Van Wormer, Jr.
BY
Ezekiel Wolf, Wolf & Greenfield
Attorneys.

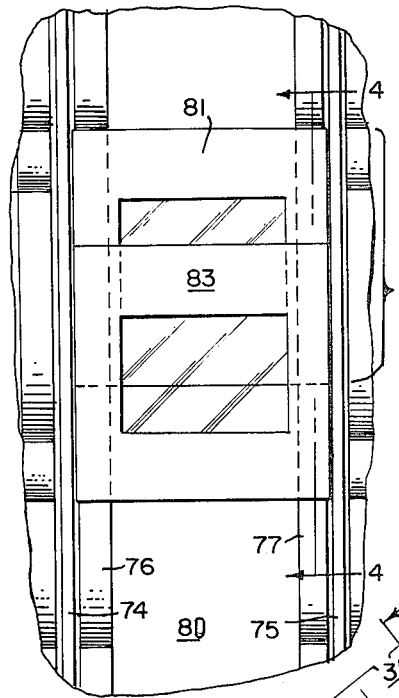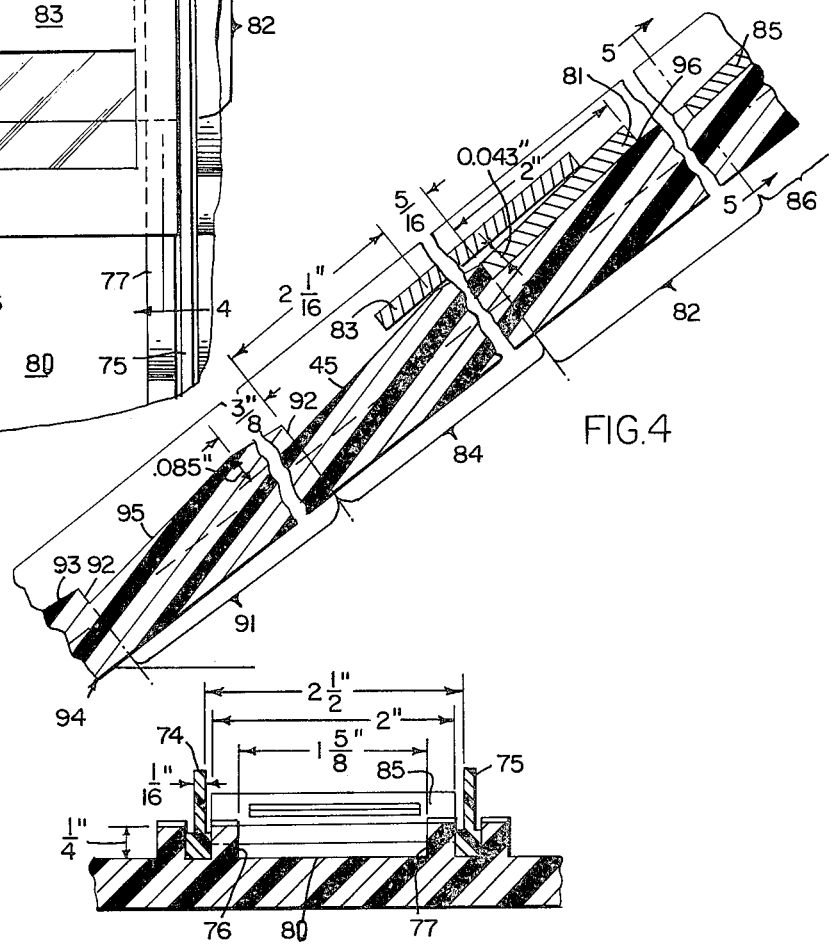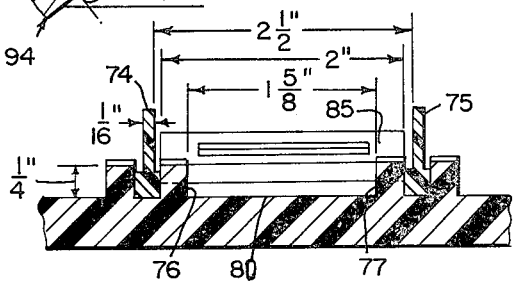

United States Patent Office 3,217,436
Patented Nov. 16, 1965

3,217,436
DISPLAYING
Kenneth A. Van Wormer, Jr., Winchester, Mass.
(Oak Hill Road, Harvard, Mass.)
Filed June 25, 1962, Ser. No. 205,042
17 Claims. (Cl. 40—106.1)

The present invention relates in general to displaying and more particularly concerns a novel device for conveniently and rapidly displaying a stack of elements, such as transparent photographic slides, to permit a viewer to observe all the elements simultaneously. In a preferred embodiment of the invention, the viewer releases a stack of elements at the top of the device and the invention utilizes the force of gravity to spread out the elements. While use of gravity is desired, it is by no means required as the unit can be operated flat using some other propelling means. The user can gather the elements into a stack with a single upward sweep of his thumb.

After a roll of film has been developed and converted into a number of individual slides, there are several things which you ordinarily want to do with them, for example, organize the slides into a preferred sequence before projecting them at a show for others. Ordinarily you do this ordering by looking at the slides one-by-one and laying them out on a table. While there are devices for sale which simultaneously display a number of slides, setting up the slides on these devices takes about as much time as spreading the slides on the table.

Accordingly, it is an important object of this invention to provide a device for simultaneously displaying a stack of elements rapidly and in a manner which requires a minimum of human effort.

It is still another object of the invention to achieve the preceding object while being able to rapidly and easily reassemble the spread out elements into a pack.

Still another object of the invention is to achieve the preceding object with a relatively inexpensive structure relatively easy to fabricate.

It is still another object of the invention to achieve the preceding objects with a structure that is portable, easy to set up quickly, and may be used to carry and store slides.

According to the invention, the novel display device apparatus comprises means defining a channel for guiding elements to be displayed along the length of the channel. The channel comprises a number of display sections cascaded along the channel length. Each section comprises means for supporting the element located in the preceding display section, first means for guiding the element to be displayed in that section away from the said means for supporting, and second means for guiding the element to be displayed in that section against the means for supporting in the following display section while guiding the element to be displayed in the following display section toward the first means for guiding in the following display section.

Numerous other features, objects and advantages of the invention will become apparent from the following specification when read in connection with the accompanying drawing in which:

FIG. 3 is a top view of a typical display section of a channel showing the relationship of a slide already in position in its section and a second slide moving towards its position in the following section;

FIG. 4 is a sectional view along section line 4—4 of FIG. 3; and

FIG. 5 is a sectional view along section lines 5—5 of FIG. 4.

Figure 1:
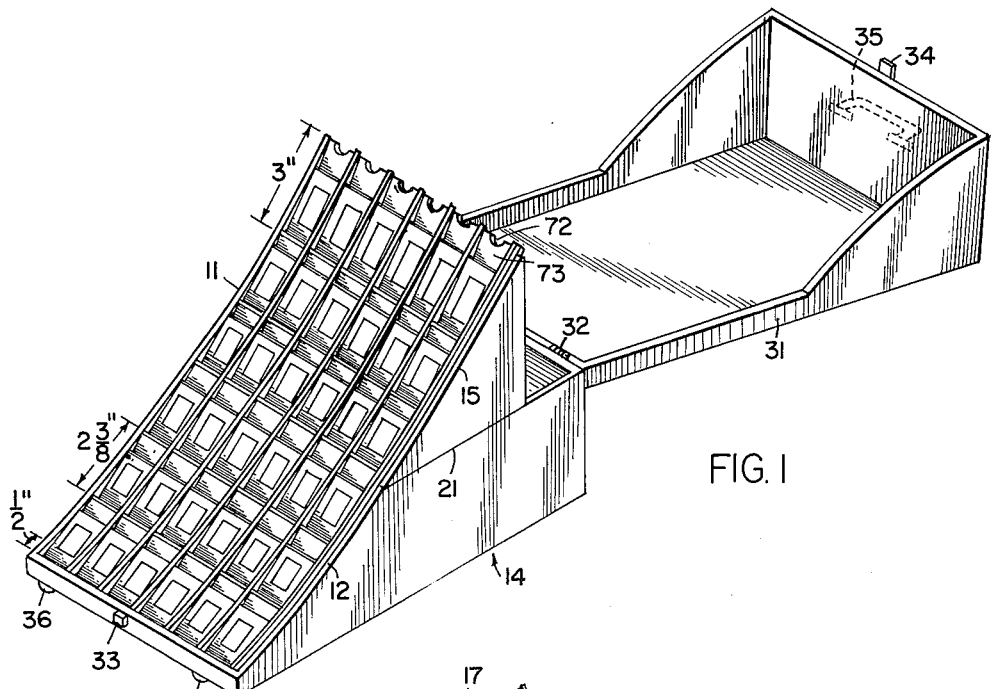
FIG. 1 shows an examplary embodiment of the invention displaying the transparent slides obtained from a full 36-exposure roll of film.
Figure 2:
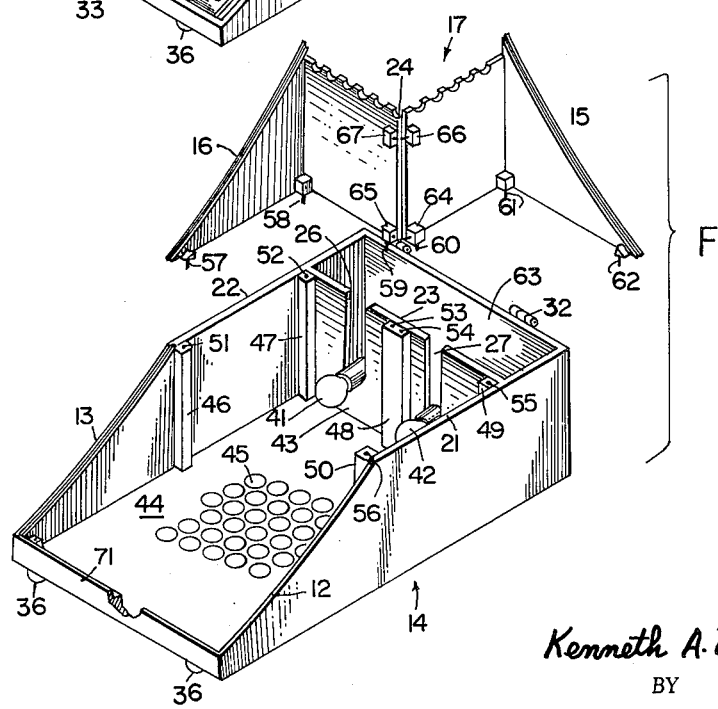
FIG. 2 is a view illustrating details of the support assembly with the rack containing the slides removed.

With reference now to the drawing and more particularly FIGS. 1 and 2 thereof, there is shown a view of an exemplary embodiment of a display device according to the invention showing 36 slides being displayed in a six channel tray 11, each channel having six slide display sections. Tray 11 is removable and supported on inset steps of the front sloping sides 12 and 13 of the supporting base 14 and the sloping sides 15 and 16 of the removable top support 17 which rests upon the top edges 21, 22 and 23 of base 14.

As best seen in the exploded view of FIG. 2, the upper support 17 includes two mating halves so that the assembly 17 may be supported inside base 14 when the invention is not being used. Then the cover 31, removably hinged to the base 14 by a pair of hinges such as hinges 32, may be placed over the base 14 with tray 11 and top support 17 stored therein to form a compact portable assembly.

Cover 31 and base 14 may be kept together by a suitable fastener, such as 33 and 34, and the entire unit carried by handle 35.

Rubber feet, such as 36, rest on a table, or other means for supporting the unit; provide free convective space for ventilation, and prevent the table from being marred.

As best seen in FIG. 2, a pair of light bulbs 41 and 42 extend from the partition 43 for illuminating the slides. At least the base 44 comprises light reflecting material, such as aluminum foil, for distributing the light through the transparencies. The bottom plate 44 is preferably formed with a number of openings like 45 for ventilating the interior and preventing the slides from getting too hot.

The three vertical posts 46, 47 and 48 are formed with top openings 51–54 for receiving respective stud 57–62 and firmly hold top support 17 in place. The four blocks 64–67 include similar studs and mating openings horizontally oriented to keep the halves of assembly 17 together.

The electrical A.C. cord (not shown) for supplying power to the light bulbs 41 and 42, may be conveniently stored in the compartment defined by partition 43 and the back 63 of the base 14. This compartment is also suitable for carrying slides.

The tray 11 is preferably made of translucent material, such as Lucite, for diffusing the light. Its color is preferably white so that the viewer sees colors more nearly approaching the true colors of the scenes captured by the color slides being viewed.

The bottom surface of the tray 11 is not shown and is not necessary for an understanding of the invention, it being sufficient to note that the bottom of tray 11 preferably rests on an inside step of front panel 17.

Each of the six channels is substantially the same as the others and includes a top semicircular opening like 72 to aid in reassembling a stack and laying a stack of slides on a top surface 73 with a pair of side walls like 74 and 75 keeping the slides from moving to the side when falling into a display section.

To display a column of slides, you need only grasp a stack of six slides between your thumb and forefinger, rest the bottom slide on the top surface 73 with your forefinger in the semicircular opening 72 and let go. Gravity pulls the pile of slides down and the channel construction results in each slide alighting in a respective display section in the order of the slide position in the pile. To gather a column of displayed slides back into a stack, you only need to place your thumb on the lower edge of the bottom slide, resting your thumb on the bottom of the channel, and move your thumb up the channel until the slides are in a stack on surface 73 in their original order with the slide just displayed at the bottom of the channel returning to its position on the top of the pile.

Then put your forefinger in semicircular opening 72 and grasp the stack of slides between your thumb and forefinger.

How the invention achieves these results will be better understood from the following description of specific display section structure illustrated in FIGS. 3–5. A slide 81 is shown in position in one display section 82 while another slide 83 is shown moving toward its resting position in the following display section 84. A portion of another slide 85 positioned in the preceding display section 86 is also shown. Each channel comprises sidewalls, like 74 and 75, separated by a distance slightly greater than the width of a slide. The slides rest and slide upon a pair of side rails, like 76 and 77, extending upward from the bottom surface 80 of the tray 11 inside the sidewalls 74 and 75.

The configuration of the side rails is best seen by examining FIG. 4, which is a sectional view of rail 77 through section 4—4 of FIG. 3 and FIG. 5, which is a sectional view of display section 86 and slide 85 through section 5—5 of FIG. 4. The shape of the rails 76 and 77 as best seen in FIG. 4 is repeated for each section and may be best described by considering section 91. Each section includes means, such as front face 92 for stopping and supporting the element to be displayed, such as slide 83. The front portion 93 then slopes away from the bottom surface 94 and toward the following section between the free or uppermost end of front face 92 and rear portion 95. Rear portion 95 then slopes toward the bottom surface 94 and the following section where it intersects the bottom of the front face 92 in the following section.

While individual sections are essentially identical, the top section does not include a front face 92 to stop a slide and is preferably a little longer, typically ⅝″, than the other sections. This extended length functions to allow the deck of slides to gain sufficient momentum before hitting the first rise 93 and peak 96 in the first section. The top section also includes a cutout 72 for receiving the index or middle finger when reassembling the deck of slides. This cutout may also be used when releasing a deck of slides, but the invention operates satisfactorily when the deck is just set down at the top of a channel.

The bottom section is essentially identical, but the lowermost front face 92 is preferably higher than the other front faces, typically ½ inch. This additional height functions to catch additional slides when the deck contains more cards than sections in the channel and to prevent the last slide from flying off because it may then have a relatively high velocity while then carrying no other slides tending to push it down against the rails. The lowermost front face could comprise one or more pegs.

It is preferred that the height of front face 92 is no greater than the thickness of an element to be displayed; otherwise, more than one element of the stack to be displayed may be stopped in one section. It is also preferred that the height of the peak 96 between front portion 93 and rear portion 95 be sufficiently low so that the component of force along the channel moving the elements downward is greater than the frictional force of opposite sense tending to oppose such movement. In the exemplary embodiment, it will be observed that the height of a triangle with the top of front portion 93 as its hypotenuse is less than the height of front face 92.

The peak 96 may be rounded for performing the following functions. When the slides drop into display position, the upward rise of face 93 to peak 96 comprises means for guiding elements to be displayed away from the free end of front face 92 and lifts the moving deck slightly upward and away from the bottom card so that the sliding deck doesn't catch on the bottom card just positioned in its display section. When reassembling the deck, the portion 95 which slopes toward peak 96 carries the partially reassembled deck to a position over the next slide to be picked up and prevents that slide from snagging the deck and interfering with reassembly.

While the minimum height of peak 96 is important for accomplishing the above-described functions, it is preferred that the height of peak 96 also be sufficiently small so that the leading edge of the lowermost slide passing over peak 96 is stopped by the face 92 of the following section while still having enough momentum to pass over peak 96.

Referring again to FIG. 1, note that tray 11 is slightly concave whereby the effective or average slopes of the different sections are directly proportional to height. The effect of this construction is to cause the component of gravitational force exerted on the element along the channel path to decrease as the element moves downward so that the velocity of the top card in the stack displayed in the bottom section remains sufficiently low to allow the card to remain in its section while being sufficiently high for the card to get there. However, racks having a flat bottom surface or one convex may be desirable or advantageous under certain circumstances and would also embody the inventive concepts. Surfaces 93 and 95 and other surfaces may be flat or curved, regardless of the curvature or lack of curvature of the bottom of the tray.

The concave curvature also makes it easier to view the entire display tray full of slides and improves the appearance of the invention. A concave surface 95 is advantageous in helping fit and hold a warped slide in the concave direction, however, it is preferred that surface 95 be flat when the tray surface is convex.

In an actual working model of the invention, made of translucent Lucite for displaying slides, the same dimensions set forth in the drawing were found to be satisfactory. In connection with displaying slides, it was found advantageous to keep the distance between rails 76 and 77 wider than the transparency width so that the shadow of the rails would not appear on the transparency. Keeping a small separation between each rail 76, 77 and the adjacent sidewall 74, 75, respectively, helps reduce wear on the edge of the slide. And the rails 76 and 77 raise each slide enough to allow the thumb, sliding upward along the channel during reassembly, to push the slide into its position in the stack being reassembled. Making each section slightly longer than the length of a slide makes it easy to pick up an individual displayed slide.

There has been described a novel display device for spreading out a number of elements for simultaneous viewing while facilitating their collection into stacks. While a specific embodiment of the invention has been described in connection with displaying photographic slides, it is evident that the principles of the invention are applicable to displaying other elements, such as playing cards, business machine cards, baseball cards, and other types of elements.

It is evident that those skilled in the art may now make numberous modifications of and departures from the specific embodiment described herein without departing from the inventive concepts. Consequently the invention is to be construed as limited solely by the spirit and scope of the appended claims.

What is claimed is:

1. Display apparatus comprising,
   means defining a channel for guiding elements to be displayed along the length of the channel, said means defining the channel comprising means defining a bottom surface,
   said channel comprising a plurality of display sections cascaded along its length,
   each section comprising,
   means for supporting the element displayed in the section, said element supporting means having a free end, said means for supporting the element comprising a raised portion extending generally perpendicular, to said bottom surface,
   first means for guiding the element to be displayed in said each section away from the free end of the means for supporting, in the section which precedes said each section, and second means following said first means for guiding for guiding the element to be displayed in said each section against the means for supporting in said each display section, said first means for guiding comprising a first portion extending from the free end of said raised portion toward said second means for guiding and sloping further away from said bottom surface, said second means for guiding comprising a second portion extending from said first portion toward said element supporting means of said each section and sloping toward said bottom surface.

2. Display apparatus in accordance with claim 1 and further comprising a plurality of said channels arranged side-by-side.

3. Display apparatus in accordance with claim 1 and further comprising, means for supporting said channel inclined with the horizontal so that gravitational force may act upon elements to be displayed to move each element into a respective display section.

4. Display apparatus in accordance with claim 1 wherein said channel defining means embraces a surface curving gradually along the channel length.

5. Display apparatus in accordance with claim 3 whereing said channel defining means embraces a surface curving concavely as viewed from above.

6. Display apparatus in accordance with claim 1 wherein said channel defining means comprises a pair of vertical side rails generally perpendicular to said bottom surface.

7. Display apparatus in accordance with claim 6 wherein with said raised portion, said first portion and said second portion are between said rails.

8. Display apparatus in accordance with claim 6 and further comprising, a first section cascaded with said sections having first section rails as an extension of said side rails and having a first section first portion exetnding toward said sections and sloping away from said surface in the same sense as said first-mentioned first portions, and a first section second portion extending from said first portion toward said sections and sloping toward said surface.

9. Display apparatus in accordance with claim 8 wherein the length of said first section is greater than that of said other sections.

10. Display apparatus in accordance with claim 9 wherein the end of said first section away from said other sections is formed with a cutout for receiving a digital.

11. Display apparatus in accordance with claim 6 wherein the height of each of said raised portions is less than the length of a section.

12. Display apparatus in accordance with claim 11 and further comprising a lowermost raised portion following and immediately adjacent to the last of said sections extending generally perpendicular to said surface further from said surface than said first-mentioned raised portions so that its height is greater than that of said raised portions.

13. Display apparatus in accordance with claim 12 and further comprising, a first section cascaded with said sections having first section rails as an extension of said side rails and having a first section first portion extending toward said sections and sloping away from said surface in the same sense as said first-mentioned first portions, and a first section second portion extending away from said first portion toward said sections and sloping toward said surface.

14. Display apparatus in accordance with claim 13 and further comprising, means defining a supporting base for supporting said channel in a position inclined from the horizontal with each section above the following section.

15. Display apparatus in accordance with claim 14 wherein said channel defining means is translucent, and further comprising, a source of light within said supporting base for illuminating elements supported in said channel.

16. Display apparatus in accordance with claim 15 and further comprising, a plurality of said channels arranged side-by-side and supported by said means defining a supporting base and illuminated by said light source.

17. Display apparatus comprising, means defining a channel for guiding elements to be displayed along the length of the channel, said channel comprising a plurality of display sections cascaded along its length, each section comprising, means for supporting the element displayed in the section, said means for supporting having a free end, first means for guiding the element to be displayed in said each section away from the free end of the means for supporting in the section which precedes said each section, and second means for guiding the element to be displayed in said each section against the means for supporting in said each section, each channel comprising structure for displaying and supporting elements, said structure having a cross section along its length with a long base edge joined to a first top edge comprising said first means for guiding by a short front edge comprising said element supporting means generally perpendicular to said base edge and a second top edge comprising said second means for guiding sloping from said first top edge toward said base edge while said first top edge slopes from said short front edge in a direction away from said first base edge, said first and second top edges being shorter than said base edge and longer than the height of said front edge in the direction generally perpendicular to said base edge.

References Cited by the Examiner

UNITED STATES PATENTS

| | | | |
|---|---|---|---|
| 1,272,457 | 7/1918 | Kandler et al. | 206—45 |
| 1,573,149 | 2/1926 | Engel | 206—45 |
| 2,882,628 | 4/1959 | Fowle | 40—106.1 |
| 2,908,094 | 10/1959 | Mast | 40—106.1 |
| 2,943,410 | 7/1960 | Haggar | 40—106.1 |

FOREIGN PATENTS 948,876   2/1949   France.

JEROME SCHNALL, *Primary Examiner.*

E. V. BENHAM, LAWRENCE CHARLES, *Examiners.*